(12) United States Patent
Keith

(10) Patent No.: US 9,850,173 B2
(45) Date of Patent: Dec. 26, 2017

(54) HYBRID SANDWICH CERAMIC MATRIX COMPOSITE

(71) Applicant: The Boeing Company, Chicago, IL (US)

(72) Inventor: William P. Keith, Lakewood, CA (US)

(73) Assignee: The Boeing Company, Chicago, IL (US)

( * ) Notice: Subject to any disclaimer, the term of this patent is extended or adjusted under 35 U.S.C. 154(b) by 650 days.

(21) Appl. No.: 14/593,682

(22) Filed: Jan. 9, 2015

(65) Prior Publication Data
US 2016/0264476 A1 Sep. 15, 2016

(51) Int. Cl.
*C04B 35/76* (2006.01)
*C04B 37/00* (2006.01)
(Continued)

(52) U.S. Cl.
CPC ........... *C04B 35/76* (2013.01); *B32B 1/08* (2013.01); *B32B 5/02* (2013.01); *B32B 18/00* (2013.01); *C04B 37/005* (2013.01); *B32B 2250/40* (2013.01); *B32B 2307/30* (2013.01); *B32B 2605/18* (2013.01); *C04B 2235/5208* (2013.01); *C04B 2235/5224* (2013.01); *C04B 2235/5228* (2013.01); *C04B 2235/9607* (2013.01); *C04B 2237/34* (2013.01); *C04B 2237/343* (2013.01); *C04B 2237/361* (2013.01); *C04B 2237/365* (2013.01); *C04B 2237/38* (2013.01);
(Continued)

(58) Field of Classification Search
None
See application file for complete search history.

(56) References Cited

U.S. PATENT DOCUMENTS 5,153,152 A * 10/1992 Dawes .................... B32B 18/00
428/113
5,223,064 A * 6/1993 Gadkaree ................. B32B 5/26
156/89.25

(Continued)

FOREIGN PATENT DOCUMENTS

WO 2012118516 A1 9/2012

OTHER PUBLICATIONS

"Aluminosilicate Matrix CMCs Mechanical Properties," published by COI Cermics, Inc., no author or date available. http://www.coiceramics.com/pdfs/3%20oxide%20properties.pdf visited May 31, 2017.*

(Continued)

*Primary Examiner* — David Sample
(74) *Attorney, Agent, or Firm* — Miller, Matthias & Hull LLP

(57) ABSTRACT

A hybrid sandwich ceramic matrix composite (CMC) may comprise a first facesheet, a second facesheet, and a core between and bonded to both of the first facesheet and the second facesheet. The first facesheet and the second facesheet may each include filaments in a ceramic matrix. The hybrid sandwich CMC may be configured for exposure to a thermal gradient in which the first facesheet is exposed to a higher temperature environment than the second facesheet. The first facesheet and the second facesheet may have at least closely matching coefficients of thermal expansion, and the first facesheet may have a higher compressive strength than the second facesheet.

18 Claims, 6 Drawing Sheets

(51) Int. Cl.
*B32B 5/02* (2006.01)
*B32B 1/08* (2006.01)
*B32B 18/00* (2006.01)

(52) U.S. Cl.
CPC .... *C04B 2237/385* (2013.01); *C04B 2237/76* (2013.01); *C04B 2237/84* (2013.01)

(56) References Cited

U.S. PATENT DOCUMENTS

| | | | |
|---|---|---|---|
| 5,376,598 A | | 12/1994 | Preedy et al. |
| 6,025,048 A | * | 2/2000 | Cutler ................... B32B 18/00 428/105 |
| 6,251,815 B1 | * | 6/2001 | Parthasarathy ....... C04B 35/111 428/293.4 |
| 8,715,439 B2 | | 5/2014 | Chakrabarti et al. |
| 2009/0004425 A1 | | 1/2009 | Lehman et al. |
| 2009/0252907 A1 | | 10/2009 | Keller et al. |
| 2010/0233424 A1 | | 9/2010 | Dan-Jumbo et al. |
| 2013/0340601 A1 | * | 12/2013 | Townsend ................ B64C 1/20 89/36.02 |
| 2014/0271161 A1 | * | 9/2014 | Lazur ..................... F01D 5/282 415/200 |

OTHER PUBLICATIONS

Search Report for related European Application No. EP15196462; report dated May 24, 2016.

* cited by examiner

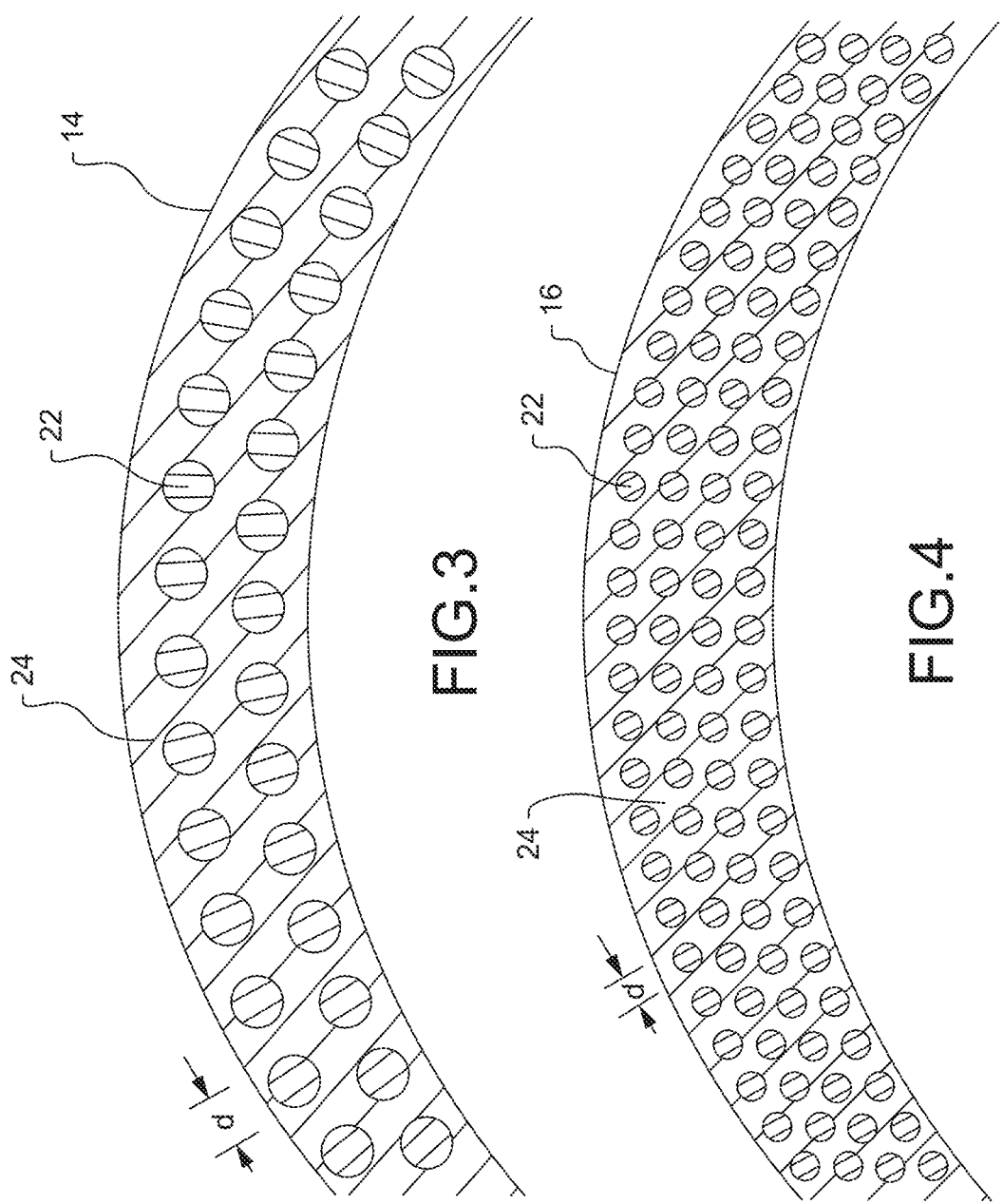

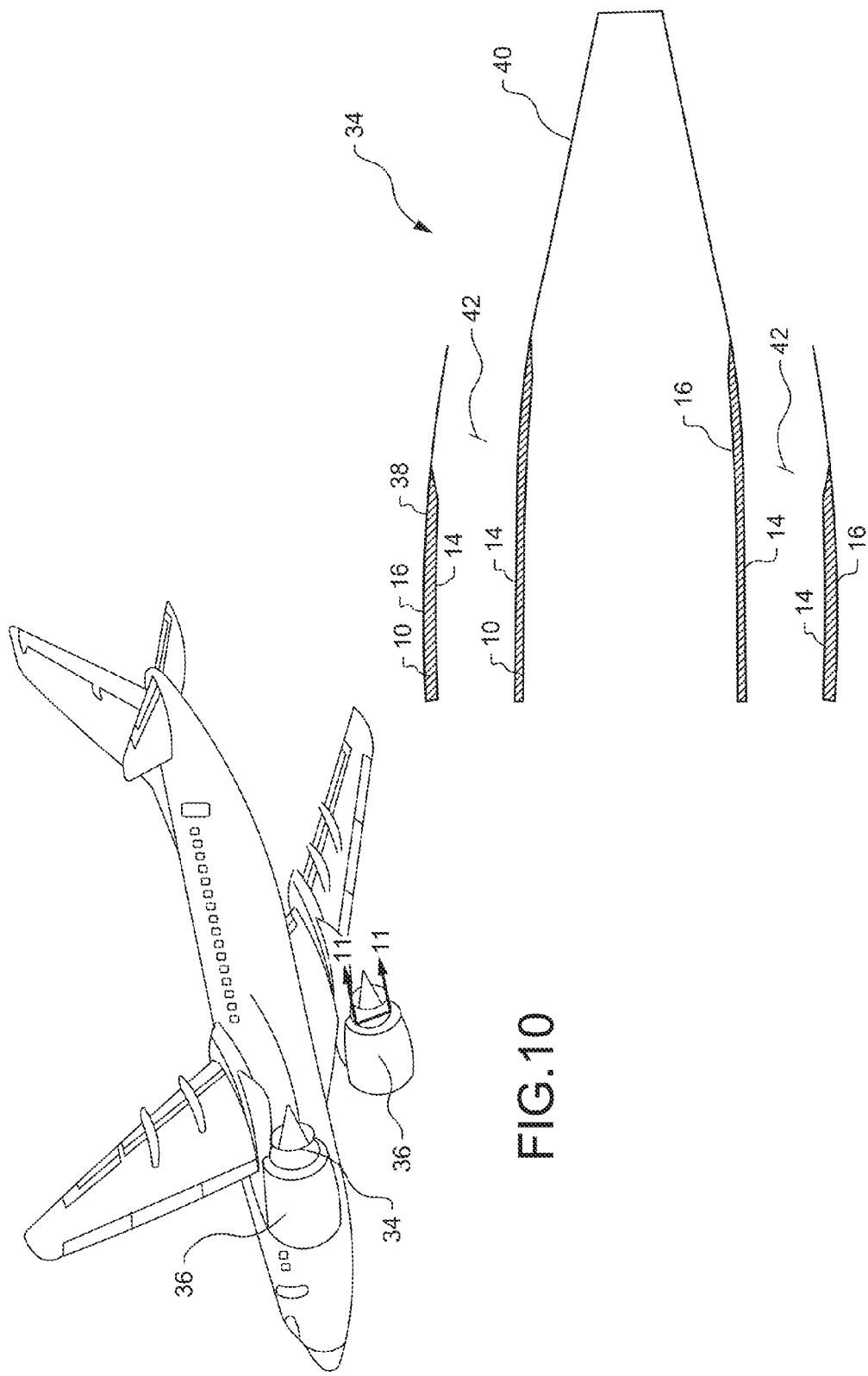

HYBRID SANDWICH CERAMIC MATRIX COMPOSITE

FIELD

The present disclosure generally relates to ceramic matrix composites, and more specifically, relates to hybrid sandwich ceramic matrix composite structures that are exposed to thermal gradients.

BACKGROUND

Ceramic matrix composites (CMCs) are composite materials consisting of a ceramic matrix having reinforcement materials (e.g., particulates, whiskers, non-woven fibers, woven fibers) embedded therein. CMCs are attractive materials for use in aerospace applications because they are relatively lightweight and are able to sustain high operating temperatures. For example, CMCs may be beneficial for the construction of exhaust system components because they are lighter in weight and are able to sustain longer exposures to exhaust temperatures than some metal-based structures (e.g., titanium and nickel-based alloys) used currently.

CMC sandwich structures, which include a load-transferring core bonded to and between two identical facesheets, have been explored as exhaust components for aircraft applications (see U.S. Patent Application Publication Number 2009/0004425). While effective, CMC sandwich components may be subjected to stresses when a high thermal gradient exists across the sandwich structure, particularly when the facesheets are constrained, such as in a cylindrical sandwich structure. Specifically, the facesheet that is exposed to a higher temperature environment (the 'hotter facesheet') expands or tries to expand, but is resisted by the opposing facesheet that is exposed a cooler environment (the 'cooler facesheet'). As a result, the hotter facesheet may be subjected to compression stress due to the expansion resistance of the cooler facesheet, while the cooler facesheet may be subjected to tension stress caused by the contraction resistance of the hotter facesheet. Under some extreme conditions, such competing forces may push the CMC sandwich component to its structural limits, and structural damage may occur.

Thus, there are challenges and limitations of existing art that are to be overcome. In particular, there is a need for more robust CMC sandwich structure designs with improved resilience under thermal gradient conditions.

SUMMARY

In accordance with one aspect of the present disclosure, a hybrid sandwich ceramic matrix composite (CMC) is disclosed. The hybrid sandwich matrix CMC may comprise a first facesheet including filaments in a ceramic matrix, a second facesheet including filaments in a ceramic matrix, and a core between and bonded to both of the first facesheet and the second facesheet. The hybrid sandwich CMC may be configured for exposure to a thermal gradient in which the first facesheet is exposed to a higher temperature environment than the second facesheet. The first facesheet and the second facesheet may have at least closely matching coefficients of thermal expansion, and the first facesheet may have a higher compressive strength than the second facesheet.

In accordance with another aspect of the present disclosure, a hybrid sandwich ceramic matrix composite (CMC) is disclosed. The hybrid sandwich CMC may comprise a first facesheet including filaments in a ceramic matrix, a second facesheet including filaments in a ceramic matrix, and a core between and bonded to both of the first facesheet and the second facesheet. The first facesheet and the second facesheet may have at least closely matching coefficients of thermal expansion but may differ in at least one of a diameter of the filaments, a chemistry of the filaments, a degree of orthotropy, and an interface strength between the filaments and the ceramic matrix.

In accordance with another aspect of the present disclosure, a method for fabricating a hybrid sandwich ceramic matrix composite (CMC) is disclosed. The method may comprise providing a first facesheet and a second facesheet, wherein the first facesheet and the second facesheet each include filaments in a slurry precursor to a ceramic matrix, and wherein the first facesheet and the second facesheet differ in at least one of a diameter of the filaments, a degree of orthotropy, and an interface strength between the filaments and the ceramic matrix. The method may further comprise laying up the first facesheet on a tool, laying up a core on the first facesheet, and laying up the second facesheet on the core to provide a layup stack on the tool. In addition, the method may further comprise curing the layup stack at a first temperature, and sintering the layup stack at a second temperature to provide the hybrid sandwich CMC.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

FIG. 3 is an expanded view of detail 3 of FIG. 2, illustrating a first facesheet of the hybrid sandwich CMC, constructed in accordance with one aspect of the present disclosure.

FIG. 4 is an expanded view of detail 4 of FIG. 2, illustrating a second facesheet of the hybrid sandwich CMC, constructed in accordance with one aspect of the present disclosure.

FIG. 10 is a perspective view of an aircraft having an exhaust system that may have components formed from the hybrid sandwich CMC of the present disclosure.

FIG. 11 is a cross-sectional view through the section 11-11 of FIG. 10, depicting a center body and an exhaust nozzle formed from the hybrid sandwich CMC of the present disclosure.

It should be understood that the drawings are not necessarily drawn to scale and that the disclosed embodiments are sometimes illustrated schematically. It is to be further appreciated that the following detailed description is merely exemplary in nature and is not intended to limit the invention or the application and uses thereof. Hence, although the present disclosure is, for convenience of explanation, depicted and described as certain illustrative embodiments, it will be appreciated that it can be implemented in various other types of embodiments and in various other systems and environments.

DETAILED DESCRIPTION

Figure 2:
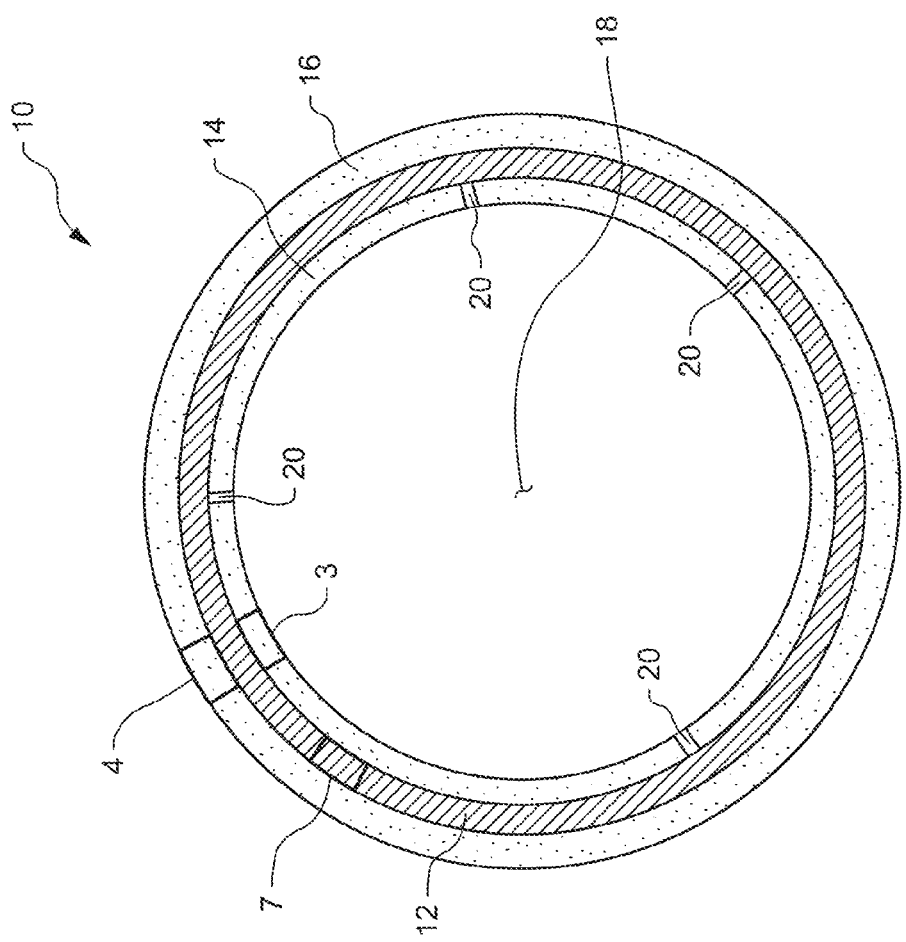
FIG. 2 is a cross-sectional view through the section 2-2 of FIG. 1, constructed in accordance with the present disclosure.
Figure 1:
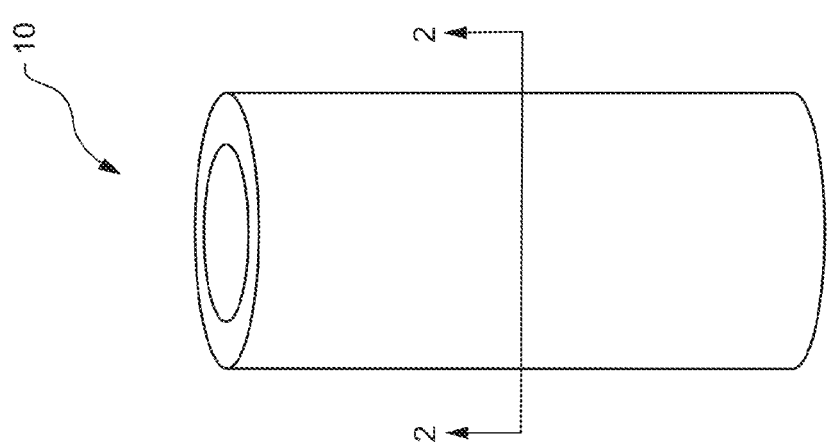
FIG. 1 is a perspective view of a hybrid sandwich ceramic matrix composite (CMC), constructed in accordance with the present disclosure.

Referring now to the drawings, and with specific reference to FIGS. 1-2, a hybrid sandwich ceramic matrix composite (CMC) 10 is shown. As used herein, the term "CMC" refers to a material consisting of one or more reinforcing materials embedded in a ceramic matrix. In addition, the term "hybrid sandwich CMC" refers to a CMC material having a core between two CMC facesheets, wherein the two facesheets differ in at least one physical property. As a non-limiting example, the hybrid sandwich CMC 10 may be a component of an exhaust system of an aircraft engine, as will be described in further detail below. The hybrid sandwich CMC 10 may include a core 12 bonded to and between a first facesheet 14 and a second facesheet 16. Both of the first facesheet 14 and the second facesheet 16 may be formed from a CMC material. In one aspect of the present disclosure, the first facesheet 14, the second facesheet 16, and the core 12 may each form a cylindrical structure such that the overall shape of the hybrid sandwich CMC 10 is cylindrical with an open center 18, as shown. Alternatively, the hybrid sandwich CMC 10 may have another type of closed configuration, or may be otherwise constrained such that flexure of the facesheets 14 and 16 cannot fully relieve stresses on the two facesheets 14 and 16. Accordingly, the hybrid sandwich CMC 10 may have other three-dimensional shapes such as, but not limited to, cubical, spherical, or cone shapes.

Under some operating conditions, the hybrid sandwich CMC 10 may be exposed to a high thermal gradient such that the first facesheet 14 (the "hotter" facesheet) is exposed to a higher temperature environment (e.g., hot exhaust gases) than the second facesheet 16 (the "cooler" facesheet). As used herein, a "high thermal gradient" refers to a condition in which the temperature difference between the first facesheet 14 and the second facesheet 16 is at least 200° F. or more. Furthermore, depending on its application, the hybrid sandwich CMC 10 may be acoustically treated to reduce or absorb sound. For example, the facesheet configured for exposure to the higher temperature environment (e.g., the first facesheet 14) may have perforations 20 formed therethrough to allow sound to enter into and dampen inside of the core 12. Although the first facesheet 14 is depicted as the inner facesheet in FIG. 2, it is noted that in some applications the facesheet exposed to the higher temperature environment may be the outer facesheet.

Under high thermal gradient conditions, the hotter facesheet 14 may try to expand more than the cooler facesheet 16 in the axial, radial, and circumferential directions. These expansion tendencies may cause the build-up of compressive stresses in the first (hotter) facesheet 14 and tensile stresses in the second (cooler) facesheet 16. In order to sustain the stresses on the hybrid sandwich CMC 10 under such conditions, the CMC material of the first facesheet 14 may be tailored such that the first facesheet 14 exhibits a higher compressive strength than its tensile strength. As a non-limiting possibility, the compressive strength of the first (hotter) facesheet 14 may exceed its tensile strength by about 1.5 times or more. Such tailoring may enable the facesheet 14 to achieve a greater compressive strength than could be possible if the material was constructed with the aim of achieving nearly equivalent tensile and compressive strengths. Likewise, the CMC material of the second (cooler) facesheet 16 may be constructed such that the second facesheet exhibits a greater tensile strength than its compressive strength. As a non-limiting possibility, the tensile strength of the second facesheet 16 may exceed its compressive strength by about 1.5 times or more. Such tailoring may enable a greater tensile strength to be achieved in the second facesheet 16 than could be possible if the material was constructed with the aim of achieving equivalent tensile and compressive strengths. As used herein, the term "compressive strength" refers to the ability of the facesheet to sustain forces when compressed primarily in the circumferential and axial directions, and the term "tensile strength" refers to the ability of the facesheet to sustain forces when pulled in expansion primarily in the circumferential and axial directions. These strengths may be for material in its pristine state or when the material has holes or damage present. As a non-limiting example, the first facesheet 14 may have a compressive strength greater than about 25 kilopounds per square inch (ksi) and a tensile strength greater than about 5 ksi, while the second facesheet 16 may have a tensile strength greater than about 25 ksi and a compressive strength of greater than about 5 ksi. As a result of such a design, the hybrid sandwich CMC 10 may exhibit improved robustness and structural strength under high thermal gradient conditions compared to non-hybrid sandwich CMCs of the prior art that use two facesheets with nearly identical tensile and compressive strengths.

Figure 6:
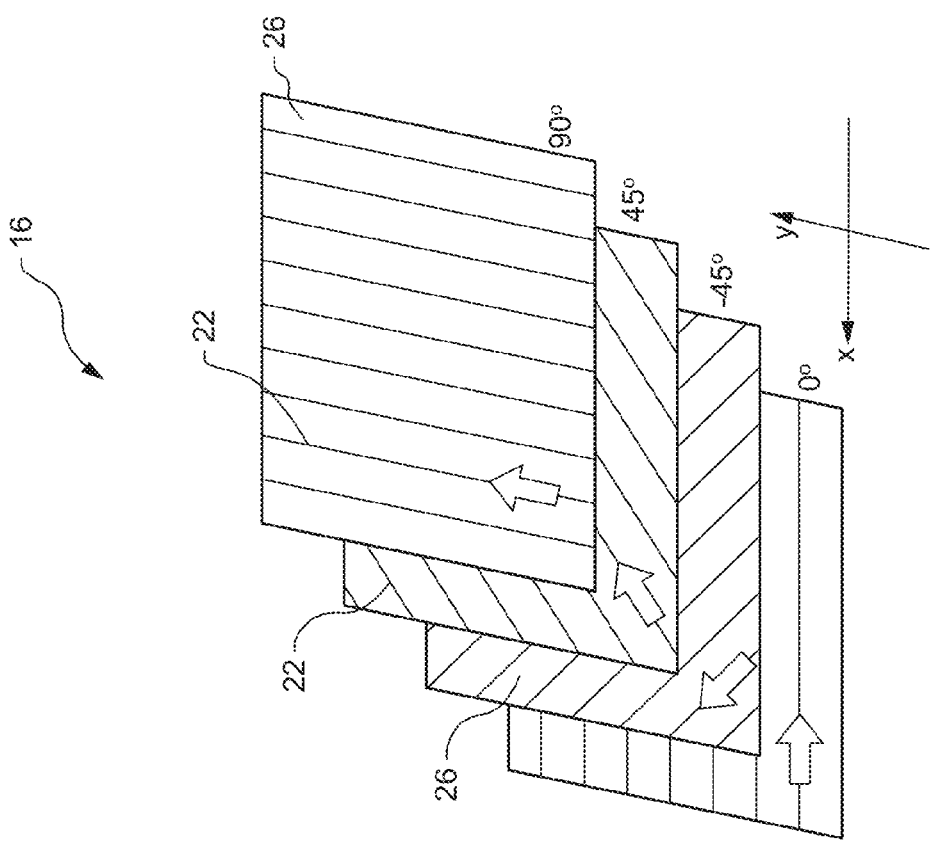
FIG. 6 is a perspective view, schematically illustrating a quasi-isotropic layup of pre-preg filament layers to provide the second facesheet, in accordance with a method of the present disclosure.

Turning now to FIGS. 3-4, the composition of the first facesheet 14 and the second facesheet 16 is shown in more detail. The first facesheet 14 and the second facesheet 16 may each consist of filaments 22 embedded in a ceramic matrix 24. Moreover, the first facesheet 14 and the second facesheet 16 may each be formed from one or more cured pre-preg layers 26 of the filaments 22 pre-impregnated with the ceramic matrix 24 (see FIGS. 5-6 and further details below). The filaments 22 may be continuous fibers having a fiber length to diameter ratio of 200 or more, and the continuous fibers may be in the form of unidirectional non-woven tape or woven fabrics. The continuous fibers may be ceramic fibers, although metallic fibers and/or carbon fibers coated with a non-oxidizable coating may also be used in some cases. However, the filaments 22 may also be other types of reinforcing materials such as, but not limited to, short/discontinuous fibers, whiskers, or particulates. In addition, the ceramic matrix 24 may include oxide ceramics such as alumina ($Al_2O_3$), magnesium oxide (MgO), and mulite ($3Al_2O_3.2SiO_2$), and non-oxide ceramics such as silicon carbide (SiC), boron nitride (BN), and carbon (C), although many other types of ceramic matrices may also be used.

The first facesheet 14 and the second facesheet 16 may both be formed from a CMC material having matching or at least closely matching coefficients of thermal expansion (CTEs) so that the hybrid sandwich CMC 10 is able to withstand high temperature sintering steps used during its fabrication. As used herein, "closely matching CTEs" refers to CTEs that are within about $0.5 \times 10^{-6}$ micrometer/meter/°F. of each other. In some cases, such small variations in the CTEs (on the order of $0.5 \times 10^{-6}$ micrometer/meter/°F.) may be acceptable and even beneficial. For example, if the facesheet 14 exposed to higher temperatures during operation has a slightly lower CTE than the facesheet 16, then cooling down from the sintering temperature during fabrication may create residual tensile stresses in the first facesheet 14 and residual compressive stresses in facesheet 16. These residual stresses may partially offset the opposite stresses induced during operation upon exposure to a thermal gradient, thereby enabling the hybrid CMC 10 to better sustain high thermal gradients in operation.

In order to provide matching or closely matching CTEs, the first facesheet 14 and the second facesheet 16 may have the same or similar chemical compositions (i.e., the same filament composition and the same ceramic matrix composition) and may have the same or similar volume fraction of the filaments 22 in the matrix 24. It is also noted that the facesheets 14 and 16 may differ in the chemical composition of the filaments 22 and/or the ceramic matrix 24 in some cases, provided that the CTEs of the two facesheets 14 and 16 are at least closely matching. As explained in further detail below, the first facesheet 14 and the second facesheet 16 may differ in at least one of a diameter of the filaments 22, a chemistry of the filaments 22, a degree of orthotropy, and an interface strength between the filaments 22 and the matrix 24. It is these differences which may give rise to the higher compressive strength in the first facesheet 14 and the higher tensile strength in the second facesheet 16. As one possibility, the filaments 22 of the first facesheet 14 may have a diameter (d) that is greater than a diameter (d) of the filaments 22 of the second facesheet 16 (see FIGS. 3-4). For example, the diameter of the filaments 22 in the first facesheet 14 may be at least about two to about ten times greater than the diameter of the filaments 22 in the second facesheet 16, although it may extend beyond this range in some cases. In such an arrangement, the larger diameter filaments 22 in the first facesheet 14 may improve the resistance of these filaments to microbuckling and/or the resistance of these filaments to failure due to local peak stresses when the first facesheet 14 is subjected to compressive strain, thus increasing its compressive strength. Moreover, since smaller diameter filaments may be manufactured with fewer structural defects, the smaller diameter filaments 22 in the second facesheet 16 may improve its tensile strength.

Alternatively, the chemical composition of the filaments 22 may be varied to adjust the respective compressive and tensile strengths of the first facesheet 14 and the second facesheet 16. For example, alumina ($Al_2O_3$) filaments may be used with varying percentages of silicates (or other molecules or elements) to tune the respective compressive and tensile strengths of the facesheets 14 and 16, although the chemical composition of the filaments 22 may be varied in numerous other ways as well. It is also noted that such variation of the chemical composition of the filaments 22 in the facesheets 14 and 16 may also be used to tune the relative CTEs of the facesheets 14 and 16, such as to provide a slightly lower CTE in the first facesheet 14.

As another possibility, the filaments 22 of the first facesheet 14 and the second facesheet 16 may have different interface strengths with the surrounding ceramic matrix 24. Specifically, the interface strength between the filaments 22 and the ceramic matrix 24 of the first facesheet 14 may be higher than the interface strength between the filaments 22 and the ceramic matrix 24 of the second facesheet 16. The higher interface strength in the first facesheet 14 may increase its compressive properties relative to the second facesheet 16, while the weaker interface strength in the second facesheet 16 may increase its tensile properties relative to the first facesheet 14.

Several strategies may be used to tune the interface strengths between the filaments 22 and the ceramic matrix 24 in the first facesheet 14 and the second facesheet 16. For example, coatings on the filaments 22 and/or additives in the ceramic matrix 24 may be used to increase the chemical compatibility between the filaments 22 and the ceramic matrix 24 in the first facesheet 14, thereby increasing its compressive strength. Alternatively, a low density (or more porous) ceramic matrix 24, or incompatible coatings, may be used in the second facesheet 16 to reduce the interface strength between the filaments 22 and the ceramic matrix 24. Strategies such as these for adjusting composite interface strengths, as well as other strategies, are well understood by those skilled in the art. In addition, such approaches may be used alone or in combination to tune the interface strengths of the facesheets 14 and 16, and their relative compressive and tensile strengths, as desired.

Figure 5:
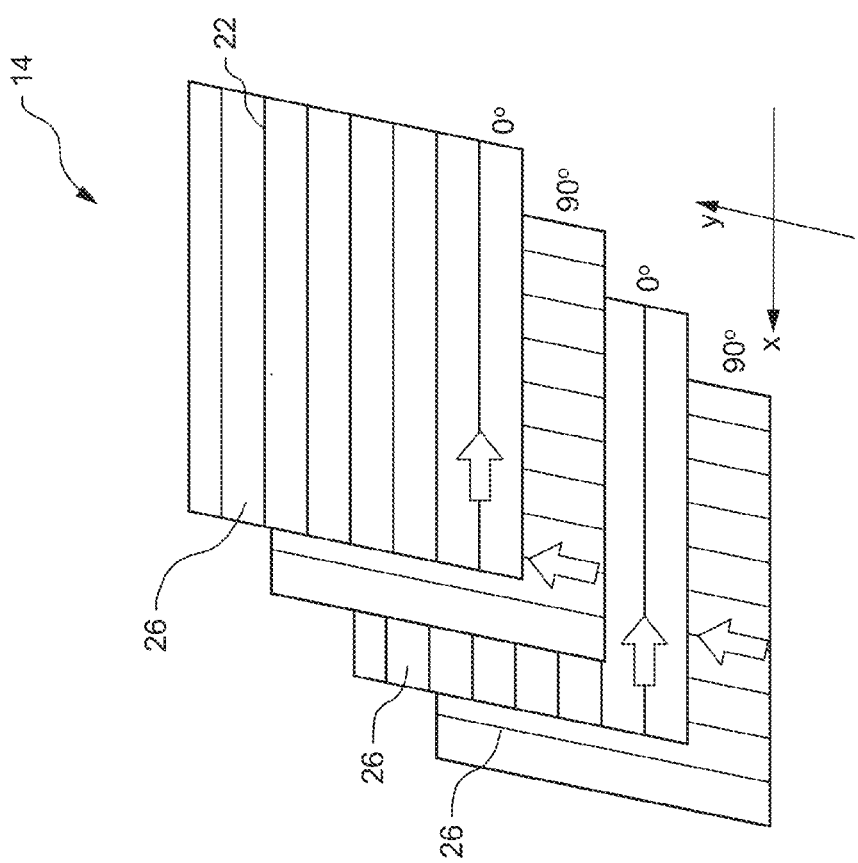
FIG. 5 is a perspective view, schematically illustrating an orthotropic layup of pre-preg filament layers to provide the first facesheet, in accordance with a method the present disclosure.

As yet another approach to tailor the respective compressive and tensile strengths of the first facesheet 14 and the second facesheet 16, the first facesheet 14 and the second facesheet 16 may also be varied in their relative degrees of orthotropy. As used herein, the term "orthotropic" means that the properties of the facesheet vary in different directions in the plane of the facesheet, and the term "quasi-isotropic" means that the properties of the facesheet are the same in all directions in the plane of the facesheet. In particular, the first facesheet 14 may be made more highly orthotropic than the second facesheet 16, while the second facesheet 16 may be made quasi-isotropic. Specifically, the pre-preg layers 26 used to form the first facesheet 14 may have a more highly orthotropic layup (than the second facesheet 16) in which more of the filaments 22 are oriented in the 0° and/or 90° directions than in the other directions (e.g., 45°, −45°, 60°, −60°, etc.) (see FIG. 5). Furthermore, the pre-preg layers 26 used to form the second facesheet 16 may have a quasi-isotropic layup in which equivalent amounts of the filaments 22 are oriented in each of the 0°, 45°, −45°, and 90° directions (see FIG. 6). Those skilled in the art will understand that alternative quasi-isotropic layups may have equivalent amounts of the filaments 22 oriented in other directions as well, such as the 0°, 60°, and −60° directions. As a result of these layup arrangements, the more highly orthotropic first facesheet 14 may have improved compressive performance, while the quasi-isotropic second facesheet 16 may have improved tensile performance as the −45° and the 45° oriented filaments (and/or the −60° and the 60° oriented filaments, etc.) may provide viable load paths to transfer tensile load around holes, defects, or other damage. It is further noted that although FIGS. 4-5 depict pre-preg layers 26 with uni-directional filaments, similar layup concepts may be applied for pre-preg layers with woven filaments as well.

The concepts for tailoring the respective compressive and tensile strengths of the facesheets 14 and 16 as disclosed herein may be used separately or in combination. For example, in some arrangements, the first facesheet 14 may have both larger diameter filaments and a higher interface strength than the second facesheet 16. As another example, the first facesheet 14 may have larger diameter filaments, a higher interface strength, and a more highly orthotropic layup than the second facesheet 16.

Figure 8:
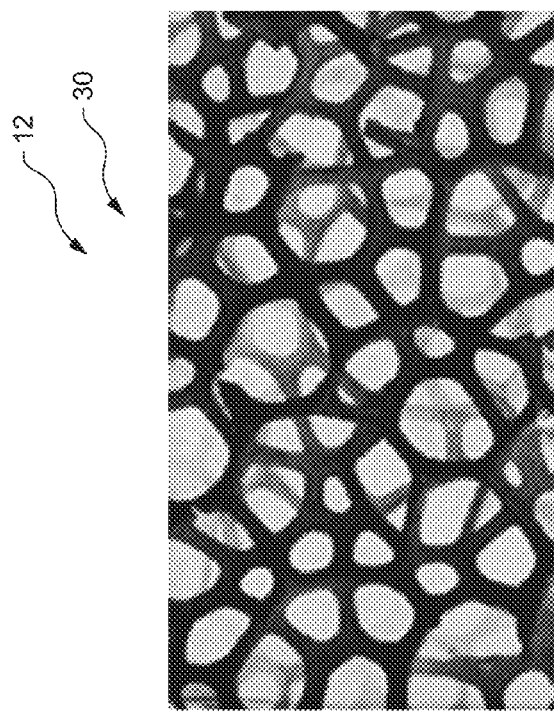
FIG. 8 is an expanded view similar to FIG. 7, but showing a foam core structure, constructed in accordance with another aspect of the present disclosure.
Figure 7:
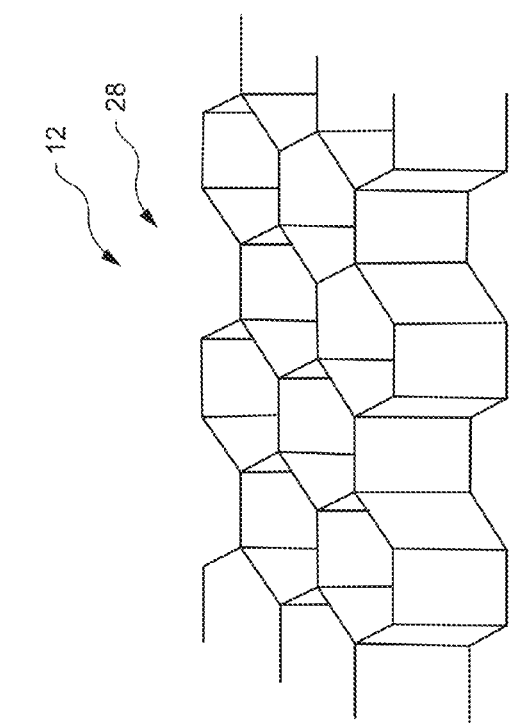
FIG. 7 is an expanded view of detail 7 of FIG. 2, illustrating a honeycomb core structure of the hybrid sandwich CMC, constructed in accordance with one aspect of the present disclosure.
Figure 9:
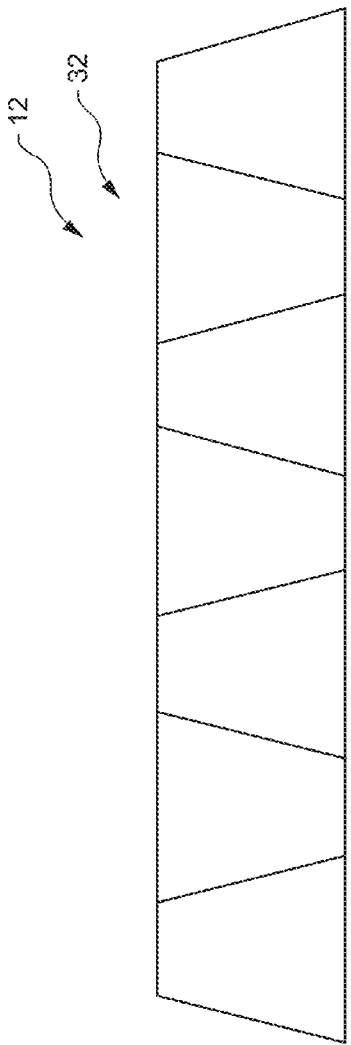
FIG. 9 is an expanded view similar to FIG. 7, but showing a truss core structure, constructed in accordance with another aspect of the present disclosure.

Referring now to FIGS. 7-9, possible structures for the core 12 are shown. The core 12 may have a honeycomb structure 28 (FIG. 7), a foam structure 30 (FIG. 8), or a truss structure 32 in which the core 12 includes diagonal members connecting the facesheets 14 and 16 (FIG. 9), although many other types of core structures apparent to those skilled in the art may be used. The core 12 may have a CTE that matches or at least closely matches (i.e., within $0.5 \times 10^{-6}$ micrometer/meter/° F.) the CTEs of the first facesheet 14 and the second facesheet 16). In this regard, the core 12 may be formed from a CMC having the same or similar chemical composition (i.e., the same filament and matrix composition) as the first facesheet 14 and the second facesheet 16. Alternatively, the core 12 may be formed from other high temperature capable materials having CTEs that match or at least closely match the CTEs of the first facesheet 14 and the second facesheet 16.

A non-limiting application of the hybrid sandwich CMC 10 is shown in FIGS. 10-11. In particular, the hybrid sandwich CMC 10 may be incorporated into an exhaust system 34 of an aircraft engine 36. The exhaust system 34 may include an exhaust nozzle 38 and a center body 40 radially inside of the exhaust nozzle 38 to define a flowpath 42 for exhaust gases therebetween. The hybrid sandwich CMC 10 may form at least a part of either or both of the exhaust nozzle 38 and the center body 40, with the first facesheet 14 tailored for high compressive strength facing the hot combustion gases of the flowpath 42, and the second facesheet 16 tailored for high tensile strength facing away from the flowpath 42, as shown. During periods of rapid temperature changes in the exhaust system 34, such as during the start of the engine 36 or during acceleration of the engine 36 from idle to full power, the hybrid sandwich CMC may be exposed to a high thermal gradient. The tailored compressive and tensile strengths of the first facesheet 14 and the second facesheet 16 may improve the ability of the hybrid sandwich CMC 10 to sustain stresses caused by the greater thermal expansion of the first facesheet 14 compared with non-hybrid sandwich CMCs of the prior art.

Figure 12:
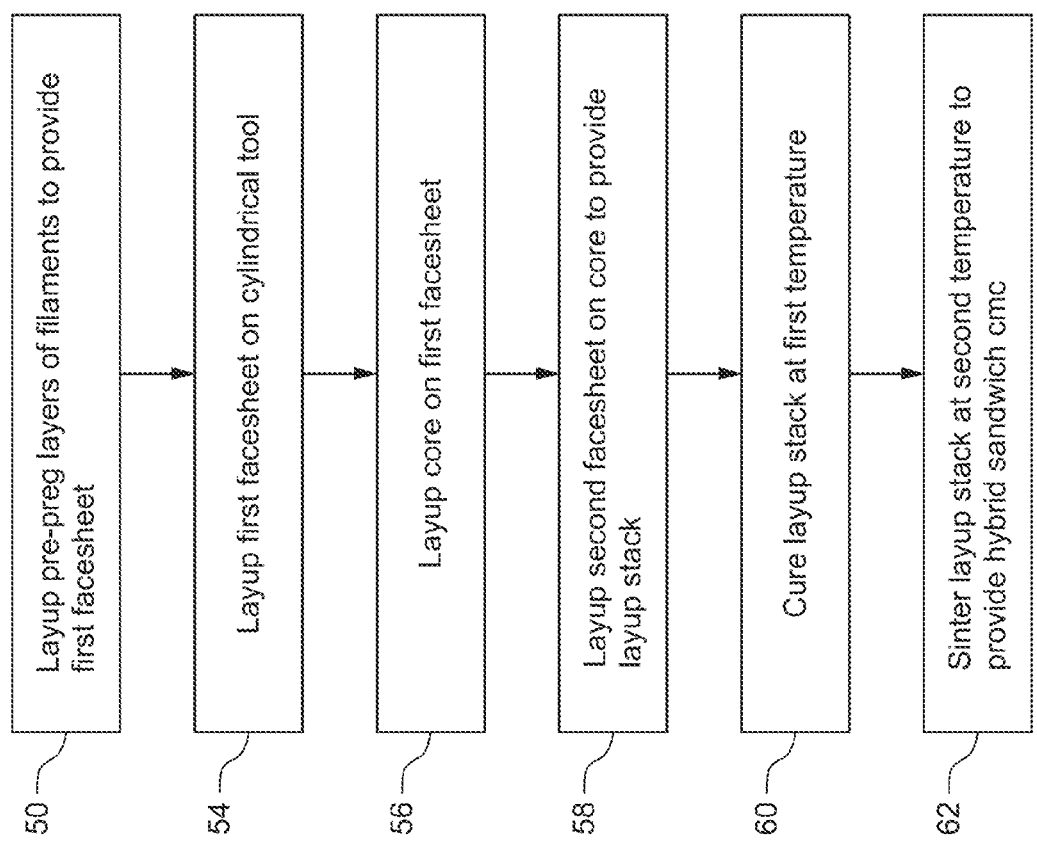
FIG. 12 is a flowchart depicting a series of steps that may be used to fabricate the hybrid sandwich CMC, in accordance with a method of the present disclosure.

Turning now to FIG. 12, a method for fabricating the hybrid sandwich CMC 10 of the present disclosure is depicted. Beginning with the block 50, the pre-preg layers 26 of the first facesheet 14 may be laid up in a stack to provide the first facesheet 14. If desired, an orthotropic layup may be established in the first facesheet 14, as described in detail above (see FIG. 5). The pre-preg layers 26 may be obtained as filament cloth pre-impregnated with a slurry precursor to the ceramic matrix 24, or they may be produced by dipping a filament cloth in the slurry precursor to the ceramic matrix 24.

The first facesheet 14 may then be laid up on a cylindrical tool (or other suitable tool capable of creating a hybrid sandwich CMC 10 in a desired shape), according to a next block 54, as shown. The core 12 may then be laid up on the first facesheet 14, and the second facesheet 16 may be laid up on the core 12 to provide a layup stack on the tool according to the next blocks 56 and 58. If desired, the pre-preg layers 26 of the second facesheet 16 may be laid up to establish a quasi-isotropic arrangement as described above (see FIG. 6). As with the first facesheet 14, the pre-preg layers 26 of the second facesheet 16 may be obtained as filament cloth pre-impregnated with a slurry precursor to the ceramic matrix 24, or they may be produced by dipping a filament cloth in the slurry precursor to the ceramic matrix 24

According to a next block 60, the layup stack on the tool may then be compacted and cured at a first temperature to allow compounds in the ceramic matrix 24 to weakly bind the facesheets 14 and 16 and the core 12 together as a single structure that can be handled and may support its own weight. The block 60 may be carried out using techniques and equipment apparent to those skilled in the art such as heated presses, vacuum bagging, and autoclaving. The cured structure may then be removed from the tool, placed in a furnace, and sintered at a higher second temperature to more strongly bind the facesheets 14 and 16 and the core 12 together and provide the hybrid sandwich CMC 10 (block 62). As explained above, the matching CTEs (or the at least closely matching CTEs) of the first facesheet 14, the second facesheet 16, and the core 12 may enable the hybrid sandwich CMC 10 to withstand cooling from the sintering temperatures, which may be on the order of several thousands of degrees Fahrenheit in some cases.

INDUSTRIAL APPLICABILITY

In general, it can therefore be seen that the technology disclosed herein has industrial applicability in a variety of settings including, but not limited to, industrial applications using CMC sandwich components exposed to high thermal gradients. The technology disclosed herein provides a hybrid sandwich CMC in which the compressive and tensile strengths of the two opposing facesheets are tailored so that the hybrid sandwich CMC component is structurally robust enough to sustain a high thermal gradient. Specifically, the facesheet exposed to the higher temperature environment is tailored for enhanced compressive properties, while the opposing facesheet exposed to a cooler environment is tailored for enhanced tensile properties. These properties allow hybrid sandwich CMC to better sustain stresses caused by the greater thermal expansion of the higher temperature facesheet compared with sandwich CMCs of the prior art that use facesheets with the same compressive/tensile properties on both sides. This technology may be particularly useful for sandwich CMCs structures in which the two facesheets are rigidly tied together and constrained so that it cannot flex easily to reduce the stresses induced by thermal gradients, such as in some cylindrical structures. Moreover, the hybrid sandwich CMC structures disclosed herein may provide improved aircraft exhaust system components compared with the metal-based structures used currently, as they are lighter in weight and are able to sustain longer exposures to exhaust temperatures. It is expected that the technology disclosed herein may find wide industrial applicability in a wide range of areas such as, but not limited to, aircraft exhaust system applications.

What is claimed is:

1. A hybrid sandwich ceramic matrix composite (CMC), comprising:
   a first facesheet including filaments in a ceramic matrix;
   a second facesheet including filaments in a ceramic matrix; and
   a core between and bonded to both of the first facesheet and the second facesheet, the hybrid sandwich CMC being configured for exposure to a thermal gradient in which the first facesheet is exposed to a higher temperature environment than the second facesheet, the first facesheet and the second facesheet having at least closely matching coefficients of thermal expansion, and the first facesheet having a higher compressive strength than the second facesheet, a diameter of the filaments in the first facesheet being greater than a diameter of the filaments in the second facesheet.

2. The hybrid sandwich CMC of claim 1, wherein the second facesheet has a higher tensile strength than the first facesheet.

3. The hybrid sandwich CMC of claim 2, wherein the first facesheet has a compressive strength that is about 1.5 times higher than a tensile strength of the first facesheet, and wherein the second facesheet has a tensile strength that is about 1.5 times higher than a compressive strength of the second facesheet.

4. The hybrid sandwich CMC of claim 1, wherein the filaments of the first facesheet and the filaments of the second facesheet have a same chemical composition, wherein the ceramic matrix of the first facesheet and the ceramic matrix of the second facesheet have a same chemical composition, and wherein a volume fraction of the filaments in the first facesheet is equal to a volume fraction of the filaments in the second facesheet.

5. The hybrid sandwich CMC of claim 1, wherein the hybrid sandwich CMC is cylindrical.

6. The hybrid sandwich CMC of claim 1, wherein the first facesheet is more highly orthotropic than the second facesheet.

7. The hybrid sandwich CMC of claim 1, wherein an interface strength between the filaments and the ceramic matrix of the first facesheet is stronger than an interface strength between the filaments and the ceramic matrix of the second facesheet.

8. The hybrid sandwich CMC of claim 1, wherein a coefficient of thermal expansion of the first facesheet is lower than a coefficient of thermal expansion of the second facesheet.

9. The hybrid sandwich CMC of claim 1, wherein the hybrid sandwich CMC is part of a component of an aircraft exhaust system, and wherein the first facesheet faces an exhaust gas flowpath of the aircraft exhaust system.

10. A hybrid sandwich ceramic matrix composite (CMC), comprising:
a first facesheet including filaments in a ceramic matrix;
a second facesheet including filaments in a ceramic matrix; and
a core between and bonded to both of the first facesheet and the second facesheet, the first facesheet and the second facesheet having at least closely matching coefficients of thermal expansion but differing in at least one of a diameter of the filaments, a chemistry of the filaments, a degree of orthotropy, and an interface strength between the filaments and the ceramic matrix, the hybrid sandwich CMC being configured for exposure to a thermal gradient in which the first facesheet is exposed to a higher temperature environment than the second facesheet, the first facesheet having a higher compressive strength than the second facesheet, an interface strength between the filaments and the ceramic matrix of the first facesheet being stronger than an interface strength between the filaments and the ceramic matrix of the second facesheet.

11. The hybrid sandwich CMC of claim 10, wherein the second facesheet has a higher tensile strength than the first facesheet.

12. The hybrid sandwich CMC of claim 10, wherein a diameter of the filaments of the first facesheet is greater than a diameter of the filaments of the second facesheet.

13. The hybrid sandwich CMC of claim 10, wherein the first facesheet is more highly orthotropic than the second facesheet.

14. The hybrid sandwich CMC of claim 10, wherein a coefficient of thermal expansion of the first facesheet is lower than a coefficient of thermal expansion of the second facesheet.

15. The hybrid sandwich CMC of claim 10, wherein the hybrid sandwich CMC is cylindrical.

16. A method for fabricating a hybrid sandwich ceramic matrix composite (CMC), comprising:
laying up a first facesheet on a tool, the first facesheet including pre-preg layers of filaments in a ceramic matrix;
laying up a core on the first facesheet;
laying up a second facesheet on the core to provide a layup stack, the second facesheet including pre-preg layers of filaments in a ceramic matrix, the first facesheet and the second facesheet having at least closely matching coefficients of thermal expansion, the first facesheet having a higher compressive strength than the second facesheet, a diameter of the filaments in the first facesheet being greater than a diameter of the filaments in the second facesheet;
curing the layup stack at a first temperature; and
sintering the layup stack at a second temperature to provide the hybrid sandwich CMC, the hybrid sandwich CMC being configured for exposure to a thermal gradient in which the first facesheet is exposed to a higher temperature environment than the second facesheet.

17. A hybrid sandwich ceramic matrix composite (CMC), comprising:
a first facesheet including filaments in a ceramic matrix;
a second facesheet including filaments in a ceramic matrix; and
a core between and bonded to both of the first facesheet and the second facesheet, the hybrid sandwich CMC being configured for exposure to a thermal gradient in which the first facesheet is exposed to a higher temperature environment than the second facesheet, the first facesheet having more of the filaments oriented in the 0° and/or 90° directions than in other directions such that the first facesheet is more highly orthotropic than the second facesheet.

18. The hybrid sandwich CMC of claim 17, wherein equivalent amounts of the filaments in the second facesheet are oriented in each of the 0°, 45°, −45°, and 90° directions.

* * * * *